United States Patent [19]

Dar

[11] 4,031,627
[45] June 28, 1977

[54] LINE HOLDERS FOR BRICK AND CONCRETE BLOCK LAYING

[76] Inventor: Joseph Dar, 3036 S. Valentia, Denver, Colo. 80231

[22] Filed: July 12, 1976

[21] Appl. No.: 667,208

[52] U.S. Cl. .................................... 33/85; 33/86
[51] Int. Cl.² .................. G01C 15/10; B43L 7/00; B44D 3/00
[58] Field of Search ................................ 33/85, 86

[56] References Cited

UNITED STATES PATENTS

| | | | |
|---|---|---|---|
| 1,466,563 | 8/1923 | Rutherford | 33/85 |
| 2,215,663 | 9/1940 | Frisk | 33/86 |
| 2,335,105 | 11/1943 | Browning | 33/138 |
| 2,788,584 | 4/1957 | Adrien | 33/184.5 |
| 2,802,270 | 8/1957 | Christoffersen | 33/85 |
| 2,806,290 | 9/1957 | Tiefel | 33/85 |
| 3,156,982 | 11/1964 | Wahlin | 33/86 |
| 3,171,210 | 3/1965 | Kundel | 33/86 |
| 3,299,515 | 1/1967 | Lessard | 33/86 |

*Primary Examiner*—Steven L. Stephan

[57] ABSTRACT

This invention relates to improvements in masons line holders. Many various types of line holders has been offered to masons for use. The present invention is simple in construction, effective and efficient in the purpose deviced.

The primary object and aim is to provide a line holder which will incorporate low-cost of manufacturing and simplicity in its anchorage. Specifically the invented holder consists of one-piece wire-like body member bent in a U-shape, with two parallel sides and base; a loop is formed between each side and the base to receive the masons guide-line. The said line holder is designed to be anchored in place by inserting one of its sides in a course of soft mortar between layers of masonry and the tension of the guide-line between the same and similar holder at the other end of the line.

A further object is to provide a holder which can be anchored on the outside, as well inside corners of masonry and makes possible for the mason to work from the outside or inside building.

More objects and advantages of the present invention will be apparent by the drawings, description and claim to follow.

1 Claim, 2 Drawing Figures

LINE HOLDERS FOR BRICK AND CONCRETE BLOCK LAYING

This invention relates to line holders for brick and concrete block laying.

The set contains two identical in construction holders, masons line and plummet. The way the holders are made and their anchorage is a new conception based on the geometrical functions of brick or concrete blocks of various dimensions.

The holders are, each, of a piece of round steel, bent in shape of a U letter with two loops in its base: one on each end. The masons line is threaded through one of the loops, which will be the upper loop in holders anchored positions. On one end of the line is fastened a regular masons plummet.

To anchor the holders is enough by embedding one of their ends in one of the last courses of mortar while the other ends are at least a ½ inch obove the first brick (or block) of the consecutive course.

The plummet, on the end of the masons line, will pull down the holders, to the first bricks of the consecutive course. This way anchored holders will hold the line in tension positioning a course of the same height. No adjustments are needed if the end of the holder is fully enbeded in mortar.

The set can be used for inside and outside of the wall and the brick layers will find it convenient to work from either side of building wall - the guide line can be posisioned outside or inside.

These and more objects and advantages of this invention will appear from the following description and accompanying drawings, in which.

Figure 1:
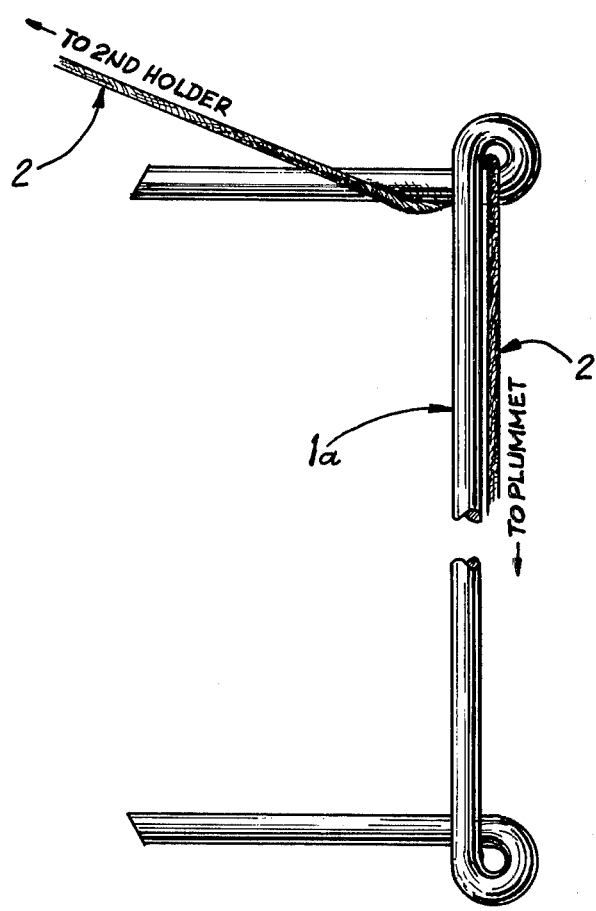
FIG. 1 is a view showing the holder 1a and the way the masons guide line, 2 should be threaded through the upper loop.
Figure 2:
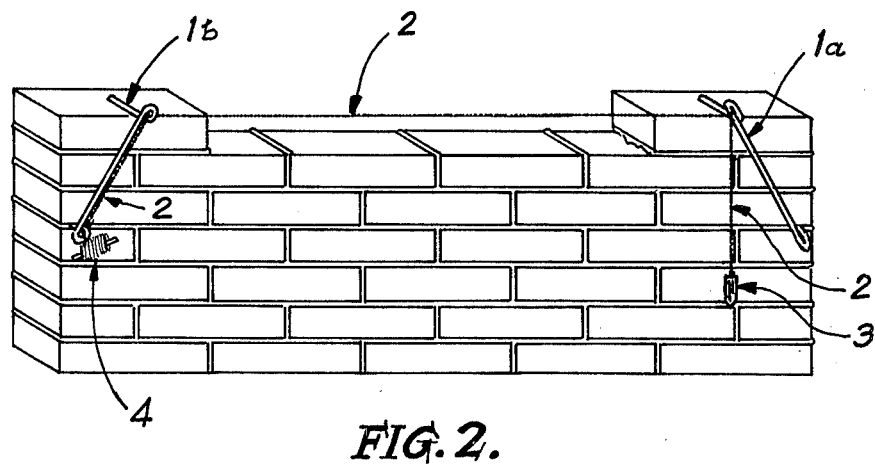
FIG. 2 is a perspective view showing a side of a partially constructed brick wall having the pair of holders 1a &1b in working position.

The plummet 3 is fastened on one end of the line 2. The other end of the line is threaded through the upper loop of the second holder 16 the same way as it is shown on FIG. 1, in opposite manner. Then threaded through the lower loop and the extended length of the line rolled up on a bobbin 4 or piece of wood. It's understood that various changes may be made in form of additional details; spring-take-up reels for the line; additional arms in various angles for multi-line grooves; changes in proportions; but without departing from the scope of my invention.

What is claimed as new and desired to be secured by Letters Patent is:

1. A pair of mason's line guide holders each of which comprises: a steel wire of a diameter small enough to be inserted into a course of freshly laid morter, the wire being bent to form a generally U-shaped member having two side legs and a base, all of which are generally straight, the side legs being substantially parallel, the connection of each of the side legs to the base comprising a corner formed by a bend in the wire of approximately two hundred seventy degrees so that a loop is formed at each corner, the base extending a distance such that as one of the side legs is pushed into a previously laid course of morter the base spans a plurality of previously laid courses of bricks and the other side leg is spaced a small distance from, and extends over a brick in the course of bricks which is presently being laid, so that the holder can pivot a slight angle about said one leg and the other leg will engage the top surface of said brick and the loop at each corner being formed in a size sufficient to receive said masons line therein.

* * * * *